March 20, 1962     D. W. FATH     3,026,460
MOTOR CONTROL SYSTEM
Filed June 9, 1959     3 Sheets-Sheet 1

INVENTOR.
DOUGLAS W. FATH
BY   *Wm. A. Autio*
ATTORNEY

March 20, 1962     D. W. FATH     3,026,460
MOTOR CONTROL SYSTEM

Filed June 9, 1959     3 Sheets-Sheet 3

INVENTOR.
DOUGLAS W. FATH
BY
ATTORNEY

United States Patent Office 3,026,460
Patented Mar. 20, 1962

1

3,026,460
MOTOR CONTROL SYSTEM
Douglas W. Fath, Milwaukee, Wis., assignor to Cutler-Hammer, Inc., Milwaukee, Wis., a corporation of Delaware
Filed June 9, 1959, Ser. No. 819,180
3 Claims. (Cl. 318—226)

This invention relates to an electric hoist mechanism and particularly to an improved hoist for lowering and raising a stockrod in and out of a blast furnace to indicate the level of the burden in the furnace.

It is desirable that the stockrod be retracted from the furnace at a relatively fast speed while the lowering operation on the other hand must be performed at a slower speed so that the weight at the end of the stockrod will not bury itself in the burden and thereby give an inaccurate reading. When lowering it is desirable that the motor exert a counter-torque against the weight of the stockrod of sufficient magnitude to automatically stop the lowering operation and hold the weight stationary when the stockrod reaches the burden. Another requirement is that the speed-torque characteristics of the hoist motor be such that variations in load due to friction in the parts, for example, will cause only a relatively small variation in speed.

It is the object of this invention, therefore, to provide a hoist motor and controller having the above characteristics at a reasonable cost.

Other objects and advantages will be pointed out in, or be apparent from the specification and claims, as will obvious modifications of the single embodiment shown in the drawings, in which:

While there are many applications for hoist mechanisms embodying my invention, for purposes of explanation the following description refers specifically to a stockrod hoist used to measure the level of the burden in a blast furnace.

Figure 1:
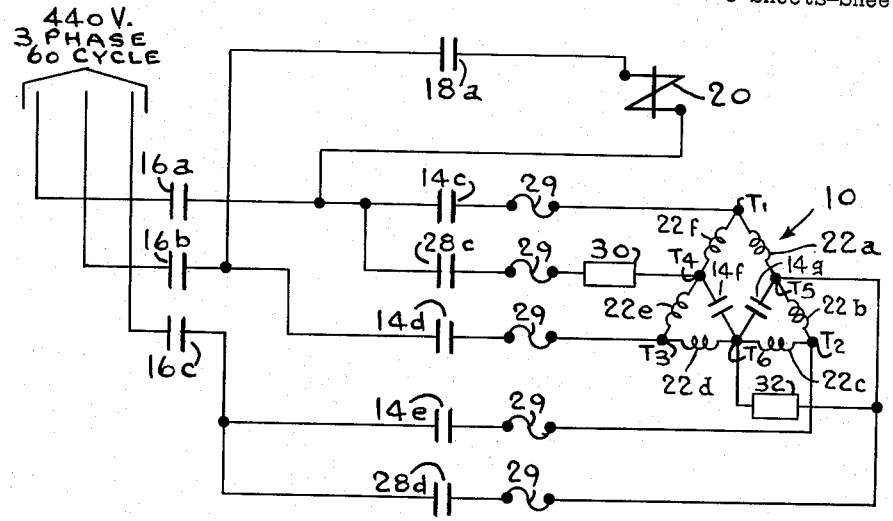
FIGS. 1 and 2 are simplified wiring diagrams which, when considered together, show a hoist motor controller embodying my invention.
Figure 2:
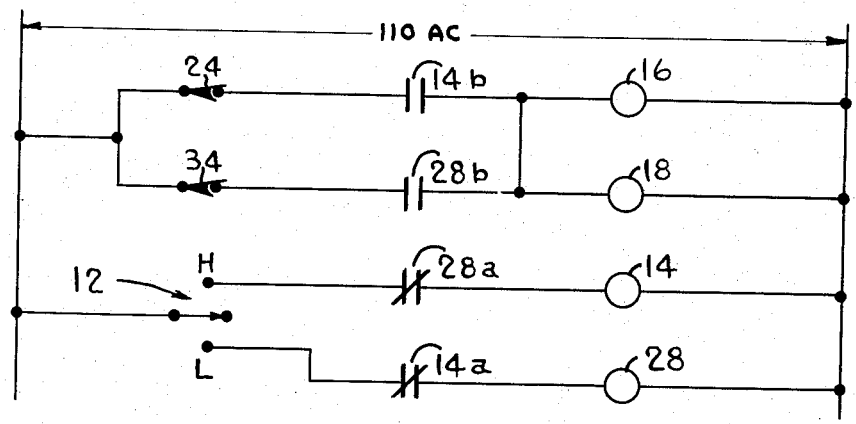

The hoist mechanism consists of a cable drum (not shown) driven by a three-phase induction motor 10 energized by a 440 volt, three-phase, 60-cycle power supply by a motor controller as shown in simplified form in FIGS. 1 and 2. The stockrod includes a weight (not shown) of about 500 pounds fastened to a cable wound on the cable drum. The stockrod is lowered into and retracted from a blast furnace by motor 10, to indicate the level of the burden therein.

Figure 6:
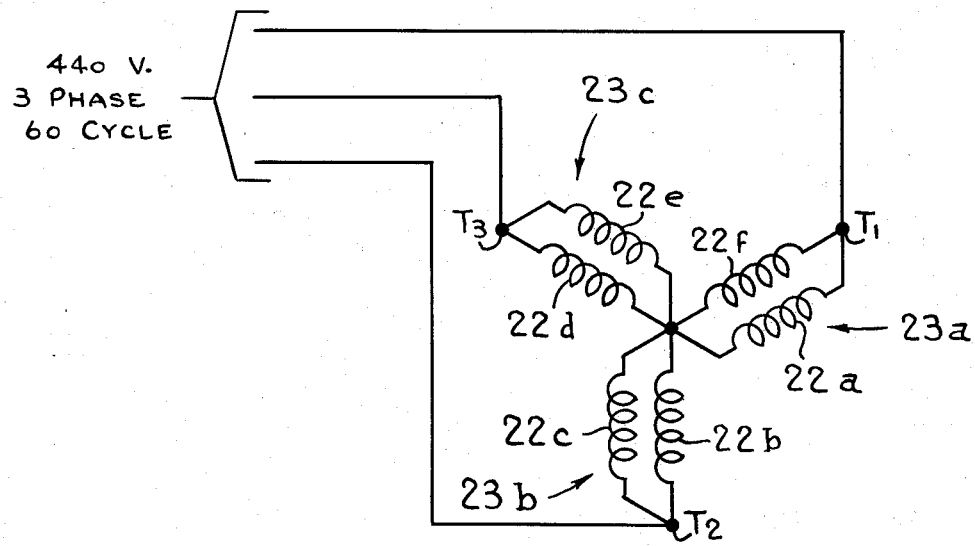
FIGS. 6 and 7 are simplified wiring diagrams of the motor controller and primary coil groups showing the circuitry for hoisting and lowering the stockrod respectively.

Assume that the stockrod is in its lowered position and that it is desired to retract it from the furnace. This is done by moving control switch 12 to position H (FIG. 2) which will energize relay 14 from the 110-volt A.C. power supply as shown. Energization of relay 14 will open normally closed switch contacts 14a and close normally open switch contacts 14b (FIG. 2) and 14c, 14d, 14e, 14f and 14g (FIG. 1). The closing of contacts 14b will energize solenoids 16 and 18 (FIG. 2) which, in turn, will close normally open line switches 16a, 16b, 16c and brake switch 18a (FIG. 1). The closing of switch 18a will energize brake solenoid 20 to release the brake (not shown). As shown in FIG. 6, the closing of contacts 16a—16c and 14c—14g will energize windings 22a, 22b, 22c, 22d, 22e, 22f of the Y-connected coil groups 23a, 23b and 23c of the motor primary by the voltage (3-phase) applied to motor terminals $T_1$, $T_2$ and $T_3$ to thus run motor 10 in a conventional manner. Motor 10 will hoist the stockrod from the furnace at its rated speed until the rod reaches its fully retracted position at which time a limit switch 24 is opened to de-energize relays 16 and 18 and thereby de-energize the motor and set the brake.

Figure 5:
FIG. 5 is a sectional view taken along line 5—5 of FIG. 4.
Figure 5:
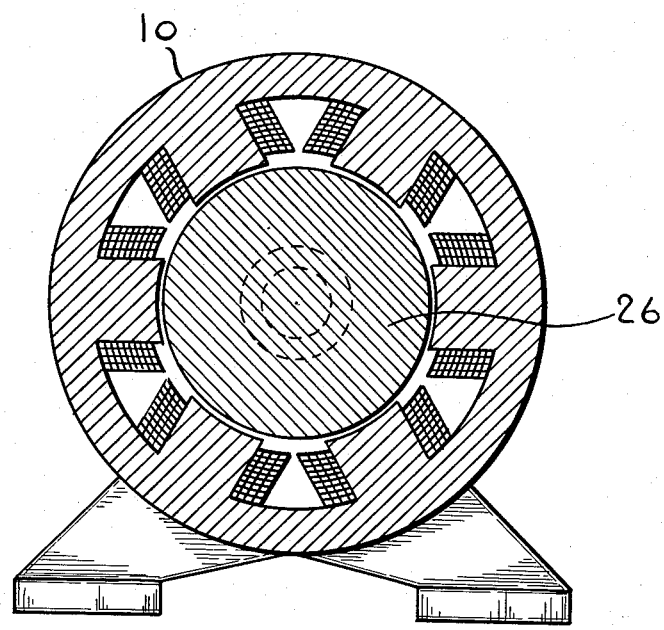

Rotor 26 of motor 10 (FIG. 5) is made of solid steel material to provide a high resistance rotor. While such a rotor can be made in various ways, a solid bar of steel turned down to the desired dimensions provides the desired characteristics at the lowest cost. Motor 10 is designed with a rated speed of 1800 r.p.m. which (due to the high resistance of the rotor) slips to a speed of 1200 r.p.m. The high slip operation is not in itself a desirable feature but by the use of a high resistance rotor the speed-torque characteristics of the motor are such that only relatively small changes in speed are caused by variations in load. The speed-torque characteristics of motor 10 are shown by a curve 27 plotted on the graph designated FIG. 3.

With the stockrod in its fully retracted position, assume it is desired to lower the stockrod into the furnace. This is done by moving control switch 12 to position L (FIG. 2) which will energize relay 28 from the 110-volt A.C. power supply as shown. Energization of relay 28 will open normally closed switch contacts 28a and close normally open switch contacts 28b (FIG. 2) and 28c, 28d (FIG. 1). The closing of contacts 28b will energize relays 16 and 18 (FIG. 2) which, in turn, close normally open line switches 16a, 16b, 16c and brake switch 18a (FIG. 1). All high voltage conductors to the various terminals of the motor primary are provided with suitable overload devices 29 as shown.

Figure 7:
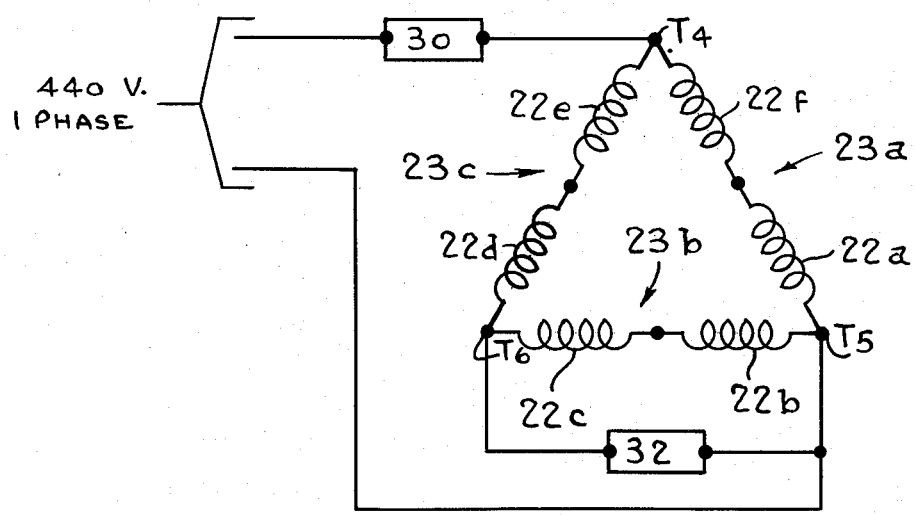
Figure 4:
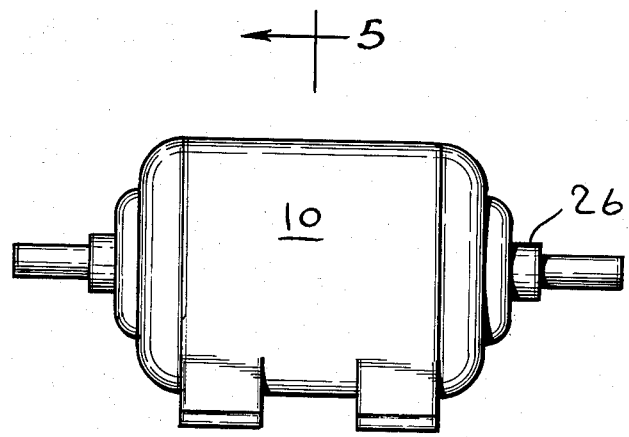
FIG. 4 is a side elevation of a simplified induction motor of the type used in my invention.

The closing of switch 18a will energize brake solenoid 20 to release the brake and the closing of switches 28c, 28d will energize motor 10 by voltage (single-phase) applied to the windings of coil groups 23a, 23b, 23c of the motor primary at terminals $T_4$, $T_5$ and $T_6$ with resistors 30 and 32 in the circuit as shown in FIG. 7. Thus, it is seen (by comparing FIGS. 5 and 6) that by switching from the hoist operation to the lowering operation the following changes are produced in the manner in which the coil groups of the motor primary are energized. First, it is noted that resistor 30 is connected in series with the primary coil groups thus reducing the voltage applied to terminals $T_4$, $T_5$ and $T_6$. Next it is seen that the coil groups are re-connected from a Y (FIG. 6) to a delta-connected arrangement (FIG. 7) and that the primary is energized single-phase (FIG. 7) instead of three-phase (FIG. 6). This results in unbalanced voltages being applied to terminals $T_4$, $T_5$ and $T_6$. Further unbalance is produced by resistor 32 connected in parallel with windings 22b, 22c of coil group 23b to thus produce a circuit wherein the voltage across each coil group is different.

With motor 10 energized (single-phase) in the manner shown in FIG. 7, a greatly reduced torque will be produced in a direction to hoist the stockrod. The weight at the end of the cable, however, is sufficient to cause the stockrod to be lowered into the furnace at the proper speed against the torque of the motor. Thus, by the use of a high resistance rotor as previously described and by the application of unbalanced voltage with resistors 30 and 32 of the proper value (9.2 and 13 ohms, respectively, in the preferred embodiment), the stockrod will be lowered at the rate of about 400 r.p.m. with a speed-torque characteristic as shown by a curve 33 plotted on the graph designated FIG. 3. The 400 r.p.m. lowering speed is slow enough so that the weight will not bury itself in the burden in the furnace and, when the weight does strike the burden, the unwinding of the cable from the drum will stop immediately and the cable will remain taut due to the counter-torque exerted by the motor.

Figure 3:
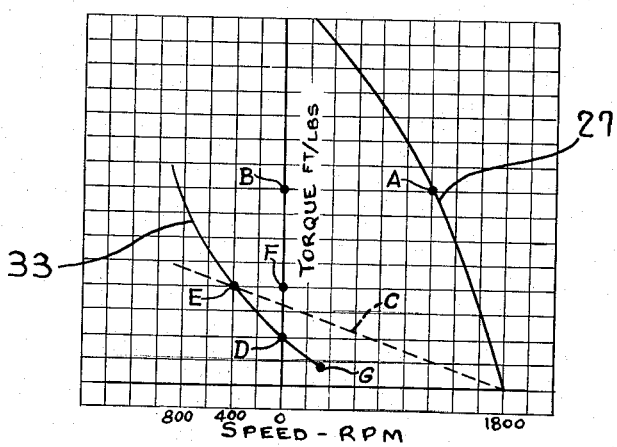
FIG. 3 is a graph showing the speed-torque characteristics of the hoist motor when hoisting and when lowering.

Referring to FIG. 3, let it be assumed that the weight is hoisted at a speed of 1200 r.p.m. whereby the hoisting operating point of the motor is at point A on curve 27. It will be seen from the graph that under this condition the motor hoists the weight with a value B of torque. The lowering characteristic of motors known heretofore is similar to curve C shown in broken line in FIG. 3. It will be apparent that a speed torque characteristic similar to curve C is unsatsifactory because variations in torque due to variations in friction and the like cause large variations in motor speed and thus render the motor speed uncontrollable. According to the invention, the high resistance of the rotor combined with the connection of resistor 30 in series with the motor coils for lowering provides a more flattened speed torque curve 33. It will be apparent from curve 33 that friction and the like cause much less variation in the lowering speed. Also, the connection of resistor 32 across coils 22b and 22c causing unbalance causes curve 33 to intersect the zero speed line at point D before the hoisting torque of the motor is reduced to zero. This intersecting characteristic has important advantages when a weight such as a blast furnace stockrod is being lowered. Normally, the motor during lowering operates at 400 r.p.m. at point E on curve 33 at a value F of counter torque. Value F of torque is sufficiently smaller than value B so that the weight overcomes this opposing torque F and lowers. In the event the lowering cable does not stop unwinding immediately when the weight strikes the burden and continues to unwind or overrun to produce slack therein whereby the stockrod tips over, the operating point of the motor shifts to point G on curve 33. It will be apparent that when the operating point passes the zero speed line, the motor reverses and rewinds the slack cable on the drum. When the slack cable has been rewound on the drum causing the stockrod to resume a vertical position, the operating point of the motor shifts to point D on curve 33. Under this condition the apparatus is in balance, that is, the value D of torque is applied to maintain the cable taut but this torque, however, is insufficient to hoist the weight.

For purposes of safety a limit switch 34 (FIG. 1) is provided to limit the depth to which the hoist will lower the stockrod into the furnace in case for any reason the weight were lowered into a furnace having little or no burden in it. When the limit switch is opened, relays 16 and 18 will be de-energized to thereby shut down the motor and set the brake.

Although but one embodiment of the present invention has been illustrated and described, it will be apparent to those skilled in the art that various changes and modifications may be made therein without departing from the spirit of the invention or from the scope of the appended claims.

I claim:

1. In a system for controlling an induction motor of the type having a high resistance rotor to operate a cable hoist whereby to raise and lower a weight, in combination, a three-phase power supply source, three groups of primary coils on the motor, and control means for connecting said groups of coils to said source to cause energization of the motor, said control means comprising switch means for controlling the motor, means responsive to operation of said switch means to a first position for connecting said coils in parallel-star connection to the three phases of said source to energize the motor for a large value of hoisting torque to raise the weight, said parallel-star connection comprising a connection of said groups of coils in star connection with the coils in each said group being in parallel connection, resistance means, and means responsive to operation of said switch means to a second position for connecting said coils in series-delta connection in circuit with said resistance means to a single phase of said source to energize the motor for a relatively smaller value of hoisting torque which is overcome by the weight to cause lowering of the latter at a slow speed, said series-delta connection comprising a connection of said groups of coils in closed loop delta connection with the coils of each group being in series connection, said resistance means being connected across certain ones of said coils to cause the voltage across the three groups of coils to be unbalanced, and said lowering connection of said groups o fcoils and said resistance means affording a motor speed-torque characteristic which provides a relatively still smaller value of hoisting torque when the weight is lowered upon a stop to cause reversal of the motor rotation to take up overrunning slack in the cable.

2. The invention defined in claim 1, together with a second resistance means, and wherein the last mentioned connection comprises means for also connecting said second resistance means in series between one side of said single phase of said source and said series-delta connected windings, and said second resistance means in conjunction with the high resistance of the rotor affording a relatively flat motor speed-torque lowering characteristic whereby speed variation under varying load is kept at a minimum.

3. In a system for controlling an induction motor of the type having a high resistance rotor to operate a cable hoist whereby to raise and lower a weight, in combination, a three-phase power supply source, three groups of primary coils on the motor there being a plurality of coils in each such group, and control means for connecting said coils to said source to cause energization of the motor, said control means comprising a switch having a hoisting operating position and a lowering operating position, electro-responsive means responsive to operation of said switch to its hoisting operating position for connecting said coils in parallel-star connection to the three phases of said source to energize the motor for a large value of hoisting torque to raise the weight, said parallel-star connection comprising a connection of said groups of coils in star connection with the coils in each group being in parallel connection, a first resistor and a second resistor, and electro-responsive means responsive to operation of said switch to its lowering operating position for connecting said coils in series-delta connection in circuit with said resistors to a single phase of said source to energize the motor for a small value of hoisting torque which is overcome by the weight to cause lowering of the latter at a slow speed, said series-delta connection comprising a connection of said groups of coils in delta connection with the coils of each group being in series connection, and said first resistor being connected across one group of said coils to cause the voltage of the three groups of coils to be unbalanced and said second resistor being connected in series between said source and said groups of coils to limit the voltage applied to the groups of coils, and said lowering connection of said coils and said resistors in conjunction with the high resistance of the rotor affording a relatively flat motor speed-torque characteristic providing a still smaller value of hoisting torque when the weight comes to rest against the stop whereby speed variation under varying load is kept at a minimum and the motor rotation reverses to take up any overrunning slack in the cable.

References Cited in the file of this patent

UNITED STATES PATENTS

| | | |
|---|---|---|
| 471,155 | Thomson | Mar. 22, 1892 |
| 2,460,234 | Myles et al. | Jan. 25, 1949 |
| 2,816,258 | Norman | Dec. 10, 1957 |

FOREIGN PATENTS

| | | |
|---|---|---|
| 434,451 | Great Britain | Sept. 2, 1935 |
| 777,278 | Great Britain | June 19, 1957 |